United States Patent
Smith

(10) Patent No.: US 6,531,846 B1
(45) Date of Patent: Mar. 11, 2003

(54) FINAL DISCHARGE OF A CELL ACTIVATED BY A CIRCUIT THAT SENSES WHEN A CHARGING FAULT HAS OCCURRED

(75) Inventor: Gregory J. Smith, Tucson, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/848,744

(22) Filed: May 3, 2001

(51) Int. Cl.[7] .................................................. H02J 7/00
(52) U.S. Cl. ........................................ 320/134; 320/135
(58) Field of Search ................................. 320/134, 135, 320/136, 132

(56) References Cited

U.S. PATENT DOCUMENTS 5,602,460 A * 2/1997 Fernandez et al. .......... 320/152
5,828,202 A * 10/1998 Tamai ......................... 320/141
6,268,713 B1 * 7/2001 Thandiwe .................... 320/134

* cited by examiner

Primary Examiner—Edward H. Tso
Assistant Examiner—Lawrence Luk
(74) Attorney, Agent, or Firm—Merchant & Gould, P.C.; Timothy P. Sullivan

(57) ABSTRACT

A method and apparatus is provided for discharging an improperly charged cell. A circuit detects when an unsafe event occurs that disables the rechargeable battery. When such an event occurs, a discharge circuit discharges the cell to a level making it safer to dispose, thereby lowering the risk of explosion. A thermal circuit may also be provided that senses the temperature of the cell and discharges the cell based on the sensed temperature.

17 Claims, 7 Drawing Sheets

US 6,531,846 B1

FINAL DISCHARGE OF A CELL ACTIVATED BY A CIRCUIT THAT SENSES WHEN A CHARGING FAULT HAS OCCURRED

FIELD OF THE INVENTION

The present invention relates generally to protection circuits for rechargeable batteries, and more particularly to a protection circuit for discharging a rechargeable battery when a protection circuit detects a fault condition.

BACKGROUND OF THE INVENTION

Many portable electronic devices utilize a rechargeable battery to provide power. These devices include computers, cellular telephones, pagers, radios, and the like. While there are many types of rechargeable batteries used today, including nickel cadmium and nickel metal hydride, lithium ion batteries have become a popular choice. Lithium ion batteries are typically smaller and lighter than other rechargeable battery types while charge capacity is increased.

The charging of lithium ion batteries is conducted in a different manner than the charging of nickel type rechargeable batteries. Generally, nickel type rechargeable batteries are charged by applying a constant current until the cell reaches a predetermined voltage or temperature. A lithium ion cell, however, uses a different charging process. First, the lithium ion cell is supplied with a current until the cell's voltage rises above a threshold. Next, the battery charger is held at the threshold until the current of the cell decreases to a predetermined level.

Therefore, if a lithium ion battery is placed within a charger designed for a nickel rechargeable battery, the result may be damaging to the battery. For example, the voltage of the lithium ion battery may rise to a dangerous level or overheat. If the battery is overcharged a potential for an explosion of the battery exists.

Protection circuits have been developed to prevent such overcharging, but may result in a battery that is unstable and unusable when disposed.

SUMMARY OF THE INVENTION

The present invention is directed at providing an apparatus and method that discharges a rechargeable battery when a fault condition has been detected while charging the battery cell. More specifically, if a protection circuit on the battery detects a fault condition, the battery cell is discharged to a safe level.

According to one aspect of the invention, a protection circuit determines when a fault condition occurs during charging. Upon the fault condition, the cell is disabled from being charged further and a discharge circuit discharges the charge stored in the cell.

According to another aspect of the invention, the protection circuit determines when an improper charging condition exists. An improper charging condition may include a charging current or voltage potential being above a predetermined threshold. When the improper charging condition is detected, the charging of the cell is stopped, and the discharge circuit discharges the charge stored within the cell to a safe level.

According to another aspect of the invention, the protection circuit includes a temperature protection circuit that determines when the temperature of the battery is above a predetermined threshold. When the temperature rises above the predetermined temperature the charging of the cell is stopped, and the discharge circuit discharges the charge stored within the cell.

DETAILED DESCRIPTION OF THE PREFERRED EMBODIMENT

Figure 1:
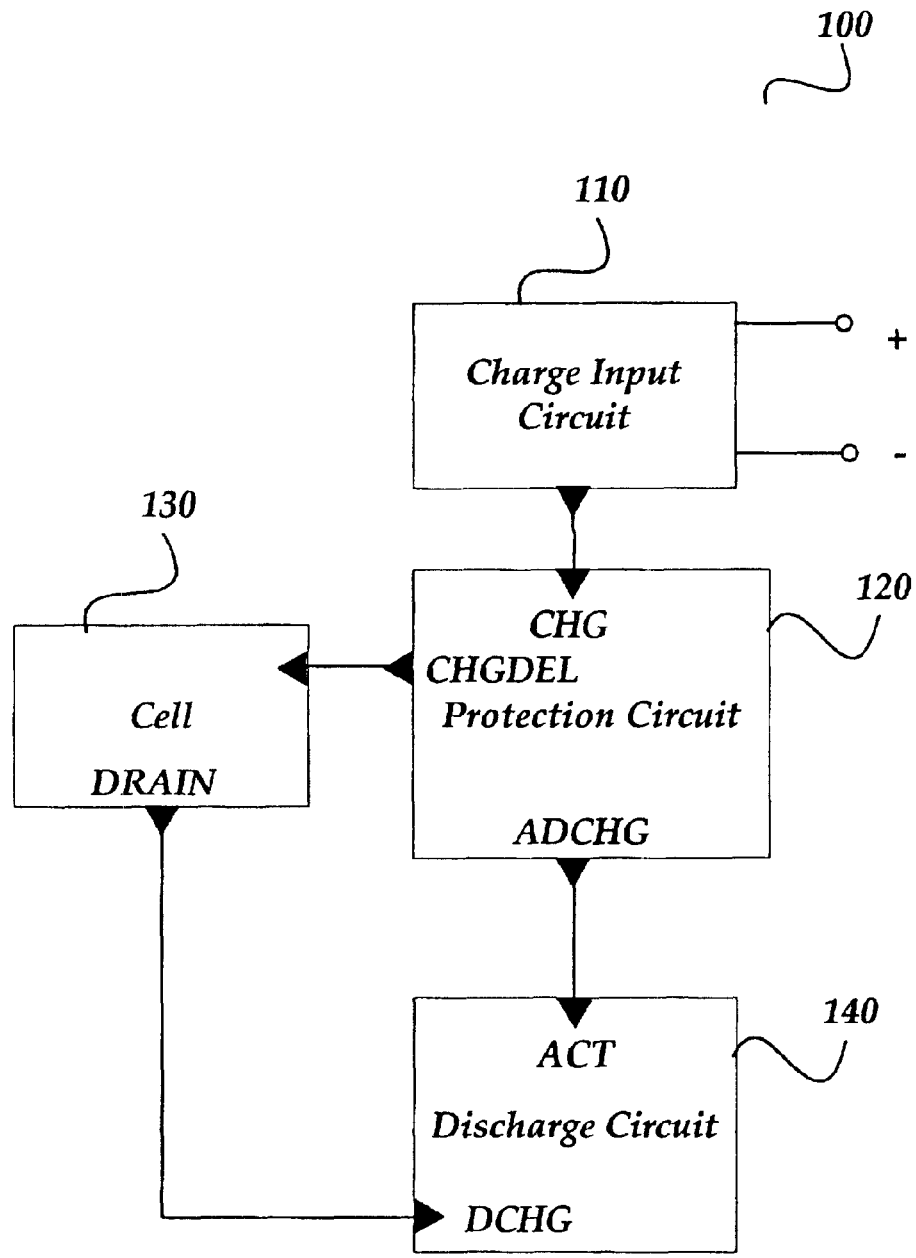
FIG. 1 shows an overview schematic diagram of a final discharge protection circuit for a rechargeable battery.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. The term "battery" includes single cell batteries and multiple cell batteries. The term "cell" includes a single cell and multiple cells. Referring to the drawings, like numbers indicate like parts throughout the views.

FIG. 1 shows an overview schematic of a final discharge battery protection system. As shown in the figure, final discharge battery system 100 includes charge input circuit 110, protection circuit 120, cell 130, and discharge circuit 140.

Charging circuit 110 has an input port arranged to receive a charging signal and an output port arranged to provide the charging signal to protection circuit 120. Protection circuit 120 includes an input port CHG, output ports CHGDEL and ADCHG. Protection circuit 120 is coupled to charge input circuit 110, cell 130 and discharge circuit 140. Cell 130 has an input port coupled to the CHGDEL port of protection circuit 120, and an output port DRAIN coupled to discharge circuit 140. Discharge circuit 140 has an input port DCHG coupled to cell 130 and an input port ACT coupled to the ADCHG port of protection circuit 120.

According to one embodiment of the invention, cell 130 is a lithium ion cell. The cell, however, may be any type of rechargeable battery cell. As will be appreciated, there are many types of rechargeable cells, each having their own charging characteristics. For example, according to other embodiments, cell 130 may be nickel cadmium or nickel metal hydride.

Charge input circuit 110 is arranged to receive a charging signal and provide the charging signal to the CHG input port of protection circuit 120. Protection circuit 120 determines if a fault condition relating to the charging exists. Protection circuit 120 may include many different functions to detect fault conditions. The fault condition may include improper charging conditions, such as a current level or voltage potential being above a predetermined threshold, or a temperature within the battery pack being above a predetermined temperature. According to other embodiments, fault conditions may include other faults related to the charging of a cell. During normal operation (when a fault condition is not detected) the CHGDEL output port of protection circuit 120 couples the charging signal to cell 130. During this time, the cell is charged. When a fault condition is detected, protection circuit 120 stops coupling the charging signal to cell 130, and notifies discharge circuit 140 to discharge the stored charge on cell 130. The notification signal is provided through the ADCH port of protection circuit 120 to the ACT input port of discharge circuit 140. According to one embodiment of the invention, the notification signal is a logical high ("1") that enables discharge circuit 140. As will be appreciated in view of the present disclosure, the notification signal may be any signal directing discharge circuit 140 to discharge cell 130. The cell 130 is discharged to a safe level when the notification signal actives discharge circuit 140. The cell 130 is discharged over a period of time. Cell 130 may be fully discharged or discharged to a predetermined level based on the cell type. Discharge circuit 140 may be designed to discharge cell 130 at a predetermined rate.

Figure 2:
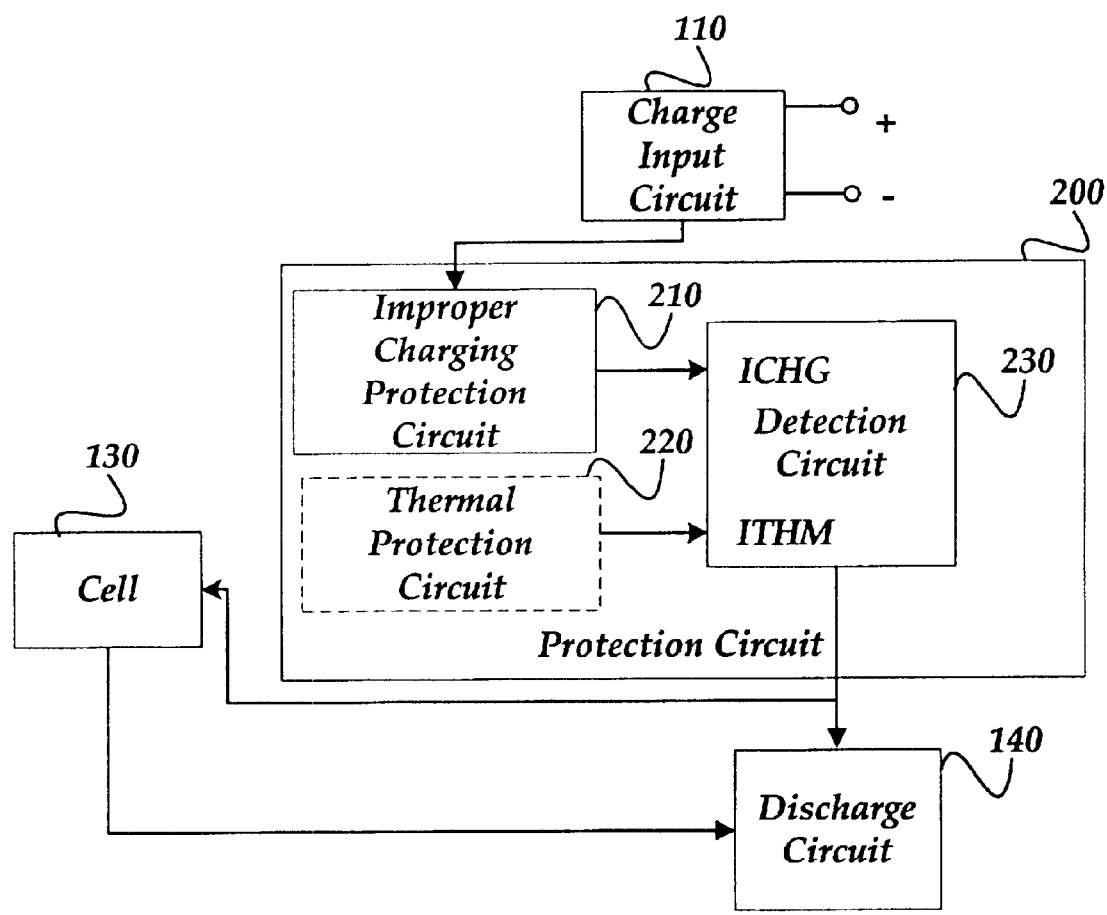
FIG. 2 shows a schematic diagram of a final discharge protection circuit for a rechargeable battery.

FIG. 2 shows an overview schematic diagram of a final discharge protection circuit 200 for a rechargeable battery. According to one embodiment, final discharge protection circuit 200 includes an improper charging protection circuit 210, and a detection circuit 230. According to another embodiment, protection circuit 200 includes improper charging protection circuit 210, detection circuit 230, and thermal protection circuit 220.

Detection circuit 230 includes input ports ICHG and ITHM and an output port coupled to cell 130 and discharge circuit 140. ICHG is coupled to improper charging protection circuit 210 and ITHM is coupled to thermal protection circuit 220. Improper charging protection circuit 210 includes an input port coupled to charge input circuit 110 and an output port coupled to detection circuit 230. Thermal protection circuit 220 has an output port coupled to detection circuit 230.

Improper charging protection circuit 210 senses when an improper charging condition exists. An improper charging condition may exist when the current level is higher than a predetermined level or when a voltage is above a predetermined threshold. The predetermined levels are based on the charging specifications of the type of cell being charged.

When an improper charging condition exists, improper charge protection circuit 210 provides a signal to the ICHG port of detection circuit 230 indicating an improper charging condition exists. Detection circuit 230 detects when an improper charging condition exists and activates discharge circuit 140, discontinues the charging of cell 130, and cell 130 is discharged to a safe level by discharge circuit 140.

The protection circuit 200, as illustrated in FIG. 2, may also include thermal protection circuit 220, according to one embodiment of the invention. Thermal protection circuit 220 helps to ensure that the battery does not reach an unsafe temperature. Thermal protection circuit 220 determines when the battery exceeds a predetermined temperature. The predetermined temperature is based on the safe charging temperature specifications associated with the cell being charged. When the predetermined temperature is exceeded, temperature protection circuit 230 provides a signal to the ITHM input port of detection circuit 230 indicating a fault condition. Detection circuit 230 detects the fault condition and activates discharge circuit 140, discontinues the charging of cell 130, and cell 130 is discharged to a safe level by discharge circuit 140.

Figure 3:
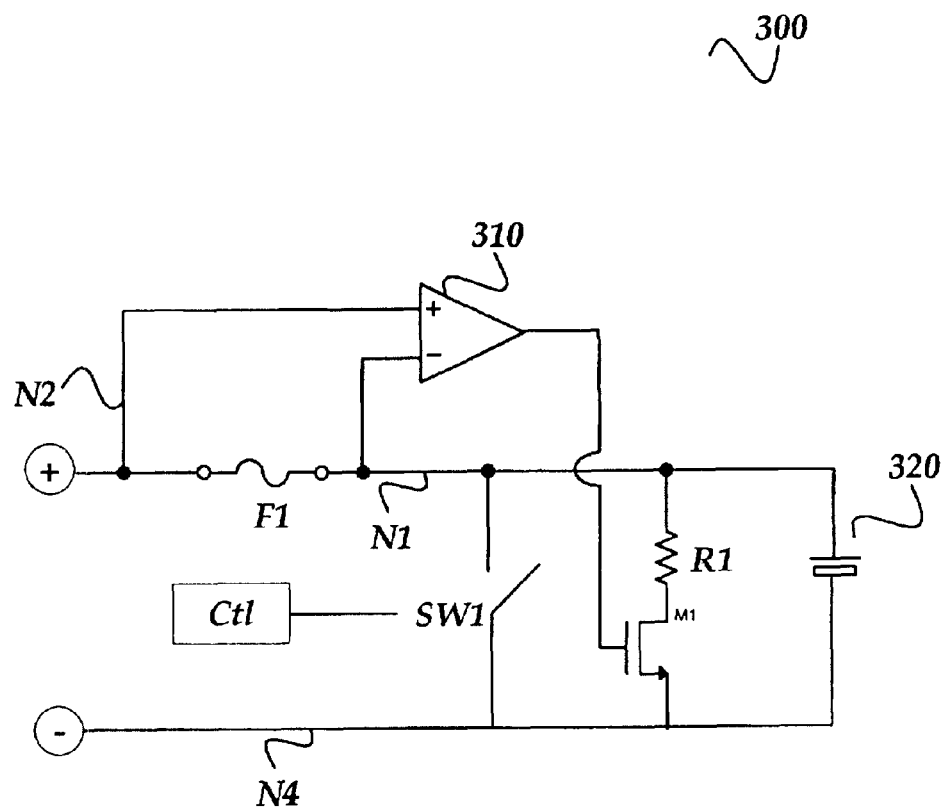
FIG. 3 illustrates a schematic diagram of a final discharge protection circuit including an improper charging protection circuit.

FIG. 3 shows a schematic of a final discharge protection circuit 300 including an improper charging protection circuit. As shown in the figure, final discharge protection circuit 300 includes: resistor circuit R1, fuse circuit F1, sense amplifier 310, transistor M1, switch SW1, and cell 320.

Sense amplifier 310 has a non-inverting terminal coupled to node N2, and an inverting terminal coupled to node N1. Fuse F1 is coupled between node N2 and node N1. Switch SW1 is coupled between node N1 and node N4. Transistor M1 has a gate coupled to the output of sense amplifier 310, a source connected to node N4, and a drain coupled to resistor circuit R1. Resistor circuit R1 is coupled between node N1 and the drain of transistor M1. Cell 320 is coupled between node N1 and node N4. A positive terminal is coupled to node N2 and a negative terminal is coupled to node N4. The positive terminal and negative terminal receive a charging signal (not shown), which is applied to charge cell 320.

Switch SW1 and fuse F1 form a battery protection network that isolates cell 320 from an improper charging condition, such as attempting to charge the cell with an improper charger. When an improper charging condition exists, a control signal (Ctl) shorts switch SW1. According to one embodiment of the invention, switch SW1 is a crowbar switch that shorts on a crowbar event. Sense amplifier 310 detects when the fuse is blown open (open circuited) and activates a discharge of cell 320 through transistor M1 and resistor circuit R1. Fuse F1 is selected such that is blows open when an improper charging condition is detected. According to one embodiment, an improper charging condition is when a predetermined current is exceeded that is determined to be unsafe or improper. The discharge time of the cell depends on the stored charge within the battery as well as the sizing of resistor circuit R1 and transistor M1. Typically, an improperly charged battery will be discharged within an eight-hour period. This is advantageous because the battery may be discarded in a safer state than when fully charged, or overcharged.

Although transistor M1 is shown as an NMOS device, transistor M1 may be an NPN transistor, a PNP transistor, a Bipolar device, a MOS device, a GaAsFET device, a JFET device, as well as one or more components that are arranged to provide the function of transistor M1 in the above described example.

Figure 4:
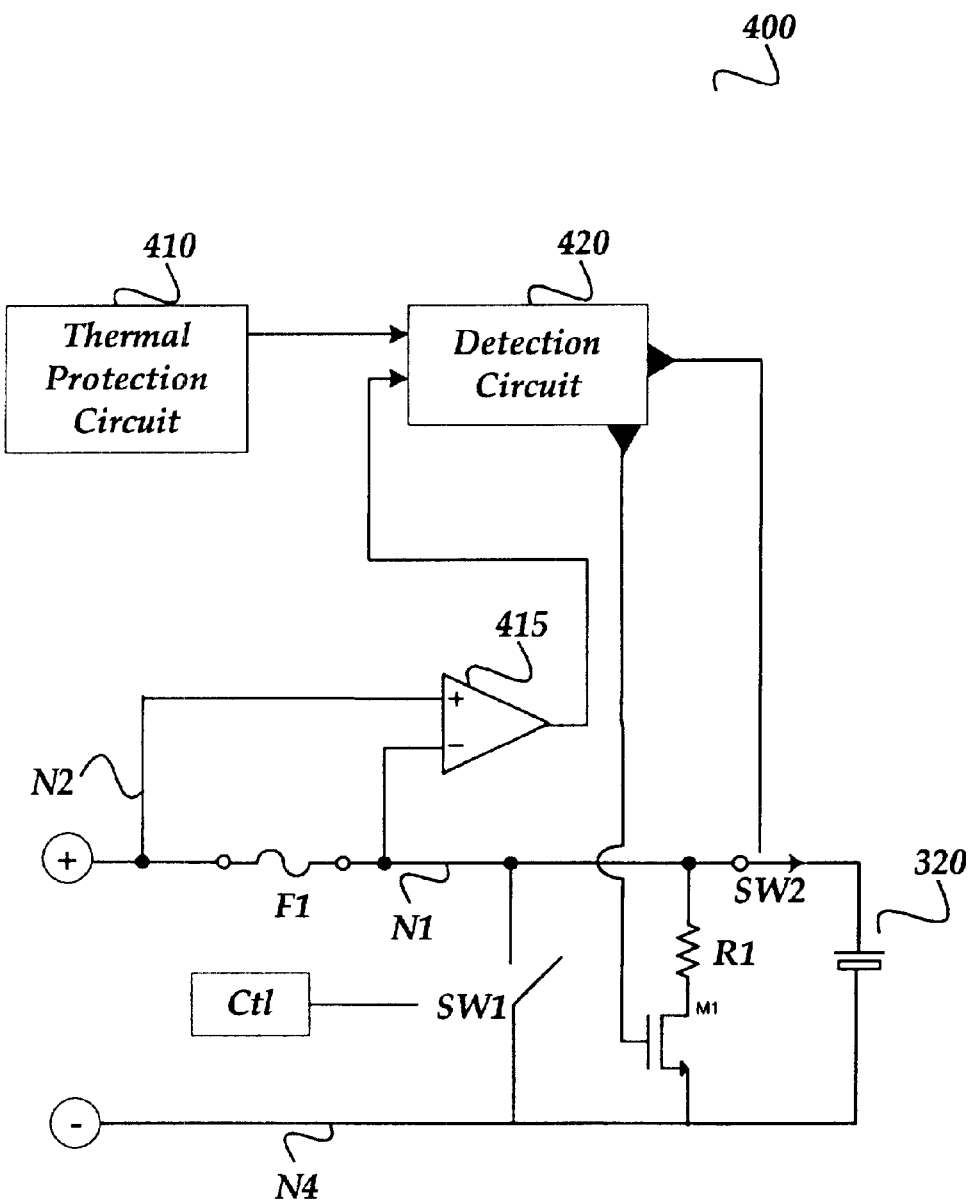
FIG. 4 illustrates a schematic diagram of a final discharge protection circuit including a temperature protection circuit.

FIG. 4 shows a schematic of a final discharge protection circuit 400 according to another embodiment of the invention. The protection circuit 400 illustrated in FIG. 4 is substantially similar to the final discharge protection circuit 300 as illustrated in FIG. 3. However, final discharge protection circuit 400 includes a thermal protection circuit. As shown in the figure, protection circuit 400 includes the components as illustrated in FIG. 3 with the addition of thermal protection circuit 410, detection circuit 420, and switch SW_2. As shown in the figure, protection circuit 430 includes fuse F1, resistor circuit R1, switches SW1 and SW2, sense amplifier 415, thermal protection circuit 410, detection circuit 420, transistor M1 and cell 320.

Sense amplifier 415 has a non-inverting terminal coupled to node N2 and an inverting terminal coupled to node N1. Fuse F1 is coupled between node N2 and node N1. Switch SW1 is coupled between node N1 and node N4. Switch SW2 is coupled between node N1 and cell 320. Transistor M1 has a gate coupled to an output port of detection circuit 420, a source coupled to node N4, and a drain coupled to resistor circuit R1. Resistor circuit R1 is coupled between node N1 and the drain of transistor M1. Cell 320 is coupled between switch SW2 and node N4. Detection circuit 420 has an input coupled to thermal protection circuit 410 and an input port coupled to the output of sense amplifier 310. A positive terminal is coupled to node N2 and a negative terminal is coupled to node N4. The positive terminal and negative terminal receive a charging signal (not shown), which is applied to charge cell 320.

The protection circuit 400 includes a thermal protection circuit 410 to protect the battery from reaching unsafe temperature levels and an improper charging circuit for protecting the cell from an improper charging condition, such as attempting to charge the cell with an improper charger. When an improper charging condition exists, switch SW1 is shorted. According to one embodiment of the invention, switch SW1 is a crowbar switch that shorts on a crowbar event. Sense amplifier 415 detects when the fuse is blown open (open circuited) and provides an activation signal to detection circuit 420 that activates a discharge of cell 320 through transistor M1 and resistor circuit R1. Fuse F1 is selected such that is blows open when an improper charging condition is detected. According to one embodiment, an improper charging condition is when a predetermined current is exceeded that is determined to be unsafe or improper.

Detection circuit 420 determines when either the sense amplifier 415 detects when the fuse F1 is blown or when the battery exceeds a predetermined temperature. According to one embodiment of the invention, detection circuit 420 may be as simple as an OR circuit. Thermal protection circuit 410 determines when a predetermined temperature is exceeded at the cell and is arranged to provide a signal to detection circuit 420 indicating the predetermined temperature has been exceeded. When detection circuit 420 detects an improper temperature, switch SW2 is opened preventing any further charging of cell 320. Detection circuit 420 also activates a discharge of cell 320 through transistor M1 and resistor circuit R1. The discharge time of the cell depends on the stored charge within the battery as well as the sizing of resistor circuit R1 and transistor M1. Typically, an improperly charged battery will be discharged within an eight-hour period. This is advantageous because the battery may be discarded in a safer state then when fully charged, or overcharged.

Figure 5:
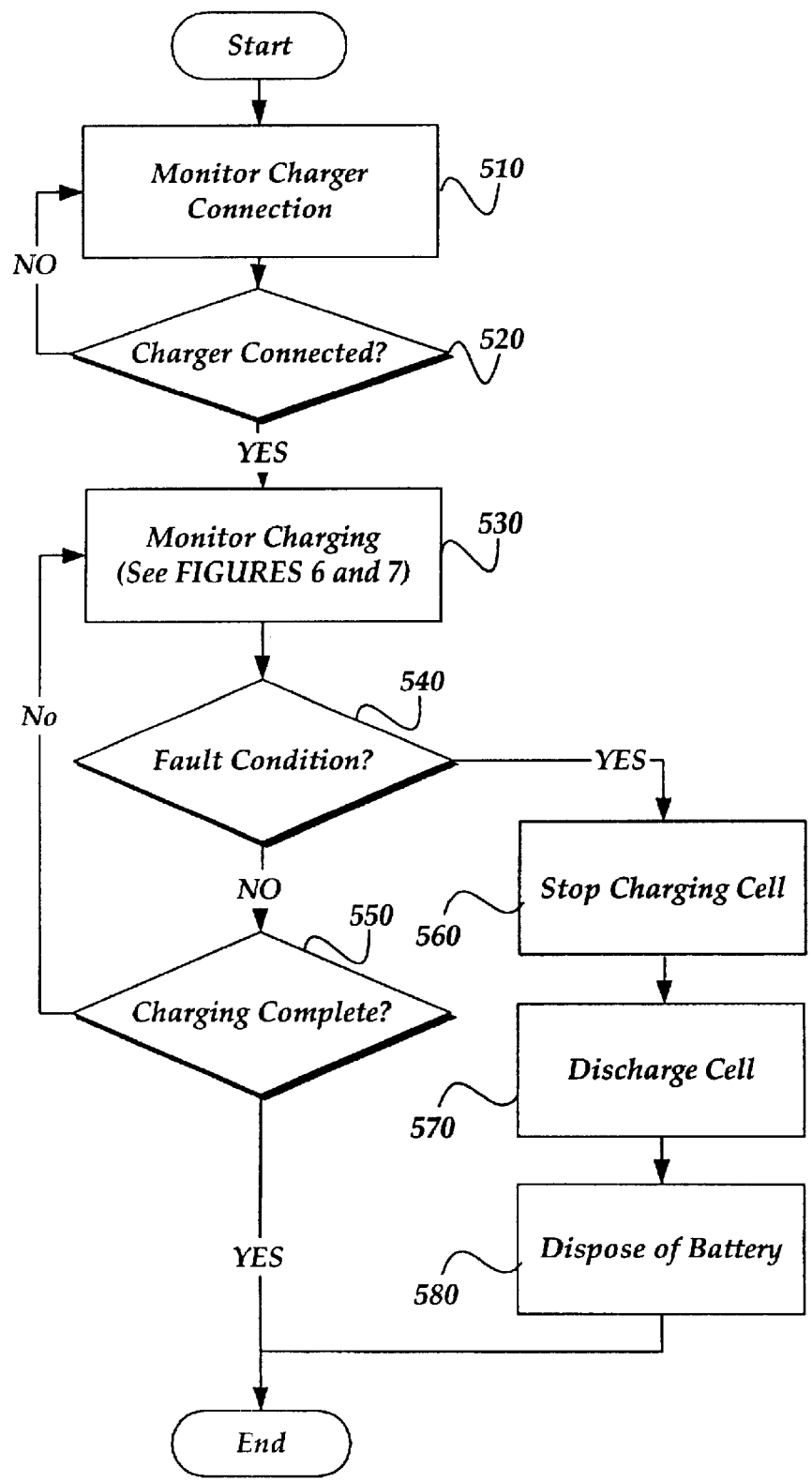
FIG. 5 illustrates an overview flow diagram of the operation a final discharge protection-system.

FIG. 5 illustrates a logical flow for a final discharge protection system. After a start block, the logical flow moves to a block 510, at which point the logic monitors the charger connection to the cell. Moving to a decision block 520, a determination is made as to whether a charger is connected to the cell. When a charger is not connected to the cell, the logic returns to block 510 to continue monitoring for a charger connection. When a charger is connected to the cell, the logic moves to a block 530, where the charging is monitored (See FIGS. 6 and 7 and related discussion). Transitioning to a decision block 540, a determination is made if a fault condition exists. A fault condition is determined based on the characteristics and properties of the cell being charged. During normal operation (when no fault condition has been detected), the logic flows to a decision block 550 that determines if charging of the cell is complete. If the charging is complete, the logic flows to an end block and terminates. If the charging is not complete, the logical flow returns to block 530 to continue monitoring charges of the cell. When a fault condition has been detected, the logical flow moves to a block 560, at which point the charging of the cell is stopped. Moving to a block 570, the cell is discharged to a safe level and the battery is disposed (block 580). The logical flow then ends.

Figure 6:
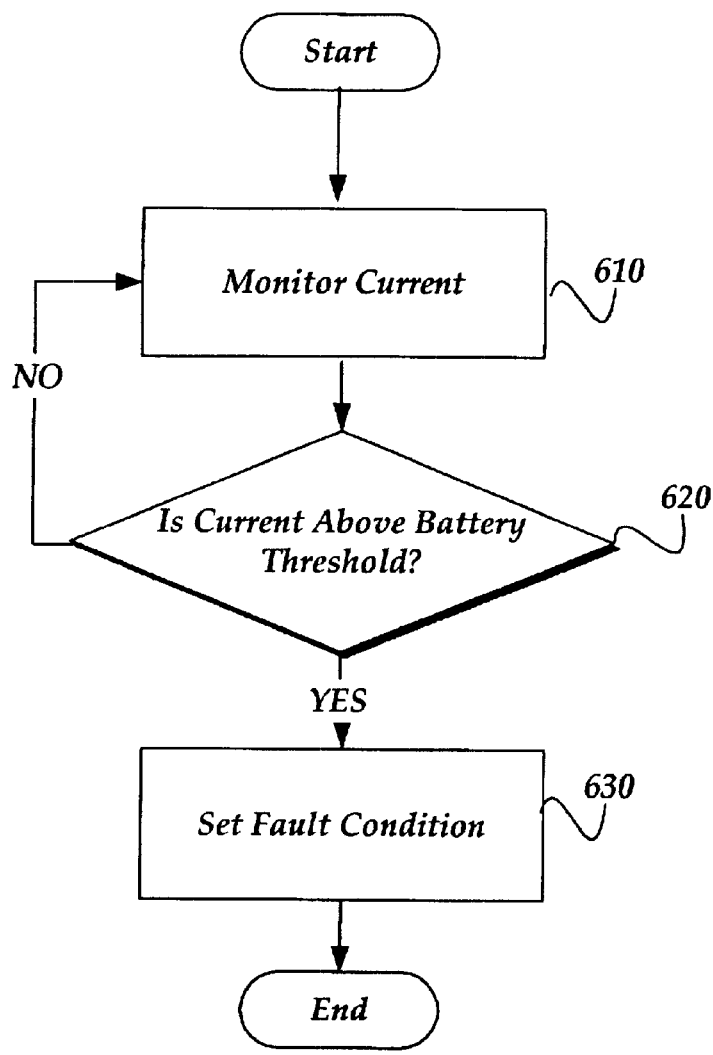
FIG. 6 illustrates a flow diagram for monitoring the current during a charging process.

FIG. 6 illustrates a flow diagram for monitoring the current during a charging process. After a start block, the logical flow moves to a block 610 that monitors the current being applied to the cell. Decision block 620 determines if the. current is above a predetermined threshold. The predetermined threshold is set based on the properties and characteristics of the battery cell being charged. When the current is not above the threshold the logical flow returns to block 610 at which point the current continues to be monitored. When the current is above the threshold, the logical flow moves to a block 630 that sets an error condition indicating that a fault condition exists. The logical flow then ends.

Figure 7:
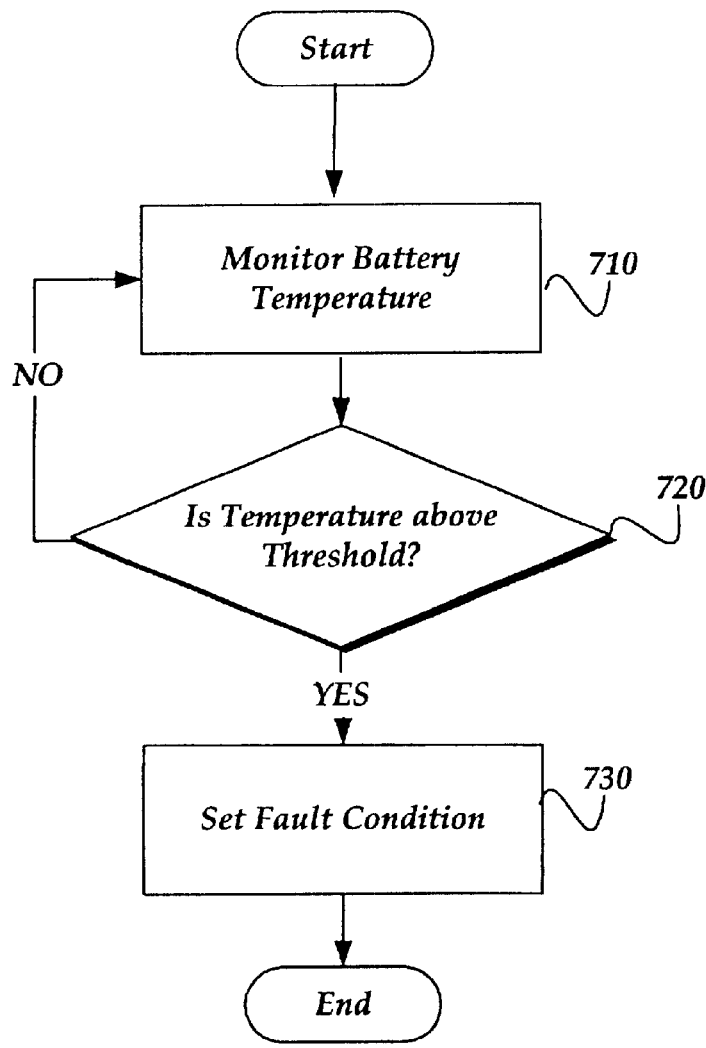
FIG. 7 illustrates a flow diagram for monitoring the temperature during a charging process.

FIG. 7 illustrates a flow diagram for monitoring the temperature during a charging process. After a start block, the logical flow moves to a block 710 that monitors the temperature of the battery. Decision block 720 determines if the temperature of the cell is above a predetermined threshold. The predetermined threshold is set based on the properties and characteristics of the battery cell being charged. When the temperature is not above the threshold the logical flow returns to block 710 at which point the temperature of the cell continues to be monitored. When the temperature of the cell is above the threshold, the logical flow moves to a block 730 that sets a fault condition indicating that the temperature of the cell has exceeded a predetermined temperature. The logical flow then ends.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for discharging a cell, comprising:
   a charge input circuit arranged to provide a charging signal to a protection circuit;
   the protection circuit arranged to provide the charging signal to the cell during normal operation and arranged to provide a notification signal to a discharge circuit when a fault condition exists for the cell; and
   the discharge circuit arranged to receive the notification signal, and when the notification signal is received arranged to discharge the cell to a safe level such that the cell may be discarded safely.

2. The apparatus of claim 1, wherein the protection circuit, further comprises, an improper charge circuit arranged to detect when a current exceeds a predetermined level.

3. The apparatus of claim 1, wherein the protection circuit, further comprises, an improper charge circuit that detects when a voltage exceeds a predetermined potential.

4. The apparatus of claim 3, wherein the improper charge circuit, further comprises a current detector circuit arranged to detecting when a current exceeds a predetermined level.

5. The apparatus of claim 1, wherein the protection circuit, comprises a sense amplifier circuit arranged to sense when the fault condition exists and arranged to provide the notification signal when the fault condition exists.

6. The apparatus of claim 5, wherein the discharge circuit, comprises:
   a resistor circuit; and
   a transistor circuit coupled to the resistor circuit and arranged to be active during the fault condition.

7. The apparatus of claim 1, wherein the protection circuit, further comprises, a thermal protection circuit that determines when a predetermined temperature is exceeded.

8. An apparatus for discharging a cell to a safe level, comprising:
   a sense amplifier having a first input coupled to a first node and a second input coupled to a second node, and an output coupled to the gate of a transistor circuit;
   a fuse circuit coupled between the first node and the second node, the fuse circuit arranged to open when a predetermined event occurs;
   a switch circuit coupled between the first node and a fourth node, the switch circuit arranged to short when an illegal charging condition occurs;
   the cell coupled between the first node and the fourth node; and
   a discharge circuit including a resistor circuit coupled between the first node and the drain of the transistor circuit, the source of the transistor circuit coupled to the fourth node; the transistor circuit arranged to drain the cell to a safe level based on the output of the sense amplifier.

9. The apparatus of claim 8, further comprising:
   a thermal protection circuit arranged to provide a thermal signal based on the temperature of the cell; and
   a detection circuit arranged to receive the thermal signal and the output of the sense amplifier; the detection circuit arranged to activate the discharge circuit based on the thermal protection circuit and the state of the fuse circuit.

10. A method for discharging a cell within a battery pack, comprising:
    determining when a fault condition exists;
    disabling the cell from being charged when the fault condition exists;
    discharging the cell to a safe level when the fault condition exists; wherein the safe level relates to a charge level of the cell such that the cell may be discarded safely.

11. The method of claim 10, wherein determining when the fault condition exists, further comprises detecting when a charging current is above a predetermined threshold.

12. The method of claim 11, wherein the predetermined threshold is based on the charging characteristics of the cell being charged.

13. The method of claim 10, wherein determining when the fault condition exists, further comprises detecting when a predetermined temperature is exceeded within the battery pack.

14. The method of claim 13, wherein the predetermined temperature is based on the temperature characteristics of the cell.

15. An apparatus for discharging a cell, comprising:
    a means for detecting when a fault condition exists during charging of the cell;
    a means for stopping charging when the fault condition exists; and
    a means for discharging the cell to a safe level when the fault condition exists; wherein the safe level relates to a charge level of the cell such that the cell may be discarded safely.

16. The apparatus of claim 15, wherein the means for detecting when the fault condition exists during charging of the cell, comprises a means for detecting when a charging signal is above a predetermined threshold.

17. The apparatus of claim 16, wherein the means for detecting when the fault condition exists during charging of the cell further comprises a means for detecting when a temperature of the cell is above a predetermined threshold.

* * * * *